United States Patent [19]

Komai

[11] Patent Number: 5,398,191
[45] Date of Patent: Mar. 14, 1995

[54] POINT OF SALE APPARATUS WITH AN AUTOMATIC DETERMINATION IF WEIGHING A PRODUCT IS NECESSARY OR PROHIBITED

[75] Inventor: Kensaku Komai, Yamatokoriyama, Japan

[73] Assignee: Sharp Kabushiki Kaisha, Osaka, Japan

[21] Appl. No.: 112,459

[22] Filed: Aug. 27, 1993

[30] Foreign Application Priority Data

Sep. 9, 1992 [JP] Japan ................................. 4-240934

[51] Int. Cl.$^6$ ............................................. G01G 19/40
[52] U.S. Cl. ................................. 364/466; 177/25.15; 235/383; 364/405; 902/22
[58] Field of Search ...................... 177/25.15; 235/383; 364/405, 466; 902/22

[56] References Cited

U.S. PATENT DOCUMENTS 4,787,046 11/1988 Feinland et al. ................. 364/466 X
4,855,908 8/1989 Shimoda et al. .................... 364/405
4,879,650 11/1989 Kurimoto et al. ........... 177/25.15 X
4,959,530 9/1990 O'Connor ........................... 235/383
5,335,171 8/1994 Fuyama .............................. 364/405
5,340,970 8/1994 Wolfe, Jr. et al. .................. 235/383

FOREIGN PATENT DOCUMENTS 63-177299 7/1988 Japan .

*Primary Examiner*—Edward R. Cosimano

[57] ABSTRACT

A point-of-sale apparatus having a key input unit including a "scale" key, a scale, one or more memories for storing an article code and, in correspondence to the article code, whether registration of the article weight is compulsory and, if not compulsory, is prohibited. The weight of the article is registered if the means for judging determines that registration of the article weight is compulsory and an error message is displayed if the means for judging determines that: (1) registration of the article weight is prohibited and (2) the scale key has been pushed.

2 Claims, 8 Drawing Sheets

FIG. 3

| | | | | | | | | | | | | | | | | | |
|---|---|---|---|---|---|---|---|---|---|---|---|---|---|---|---|---|---|
| ⇧ RECEIPT | ⇧ JOURNAL | | 5 | 10 | 15 | 20 | L3 | 10 | 20 | 30 | 40 | 50 | 60 | 70 | 80 | 90 |
| RCPT | PRINT | | 4 | 9 | 14 | 19 | L2 | 9 | 19 | 29 | 39 | 49 | 59 | 69 | 79 | 89 |
| SCALE | # | | 3 | 8 | 13 | 18 | L1 | 8 | 18 | 28 | 38 | 48 | 58 | 68 | 78 | 88 |
| AUTO 1 | AUTO 2 | | 2 | 7 | 12 | 17 | PROMO #2 | 7 | 17 | 27 | 37 | 47 | 57 | 67 | 77 | 87 |
| NS | TAX | | 1 | 6 | 11 | 16 | PROMO #1 | 6 | 16 | 26 | 36 | 46 | 56 | 66 | 76 | 86 |
| TAX2 SHIFT | TAX1 SHIFT | @/FOR | | | CL | | | 5 | 15 | 25 | 35 | 45 | 55 | 65 | 75 | 85 |
| ⊙1 | ⊙2 | 7 | 8 | 9 | PLU | CH3 | 4 | 14 | 24 | 34 | 44 | 54 | 64 | 74 | 84 |
| %1 | %2 | 4 | 5 | 6 | CONV | CH2 | 3 | 13 | 23 | 33 | 43 | 53 | 63 | 73 | 83 |
| PO | RA | 1 | 2 | 3 | MDSE SBTL | CH1 CHK | 2 | 12 | 22 | 32 | 42 | 52 | 62 | 72 | 82 |
| RFND | VOID | 0 | 00 | 000 | SBTL | CA/AT | 1 | 11 | 21 | 31 | 41 | 51 | 61 | 71 | 81 |

FIG. 4

| 10 | 36 | 37 | 38 | 39 | |
|---|---|---|---|---|---|
| 40 | 01 | 1.00 | DEPT 01 | 00 | ... |
| 41 | 02 | 2.00 | DEPT 02 | 01 | ... |
| 42 | 03 | 3.00 | DEPT 03 | 02 | ... |
| 43 | 04 | 4.00 | DEPT 04 | 00 | ... |
| | ⋮ | ⋮ | ⋮ | ⋮ | ⋮ |

FIG. 5

| 11 | 44 | 45 | 46 | 47 | |
|---|---|---|---|---|---|
| 48 | 0001 | 0.75 | PLU 0001 | 00 | ... |
| 49 | 0002 | 3.50 | PLU 0002 | 01 | ... |
| 50 | 0003 | 1.00 | PLU 0003 | 02 | ... |
| 51 | 0004 | 2.00 | PLU 0004 | 01 | ... |
| | ⋮ | ⋮ | ⋮ | ⋮ | ⋮ |

XX: DEPT. CODES (01-MAX 99)
A: SCALE REG. COMPULSORY/REG.OK(UNCOMPULSORY) REG. NO. 2/1/0
B: PACKAGE NO. 9-1/0

XXXX: PLU. CODES (0001 -MAX 9999)
A: SCALE REG. COMPULSORY/REG.OK(UNCOMPULSORY)/REG. NO. 2/1/0
B: PACKAGE NO. 9-1/0

Fig.10

| KEY INPUT | DISPLAY | PRINT |
|---|---|---|
| 31 SCALE | 57 ⌐1.250  ⌐ | |
| 55 4 | 58 ⌐1.250  4⌐ | |
| 30 PLU | 59 ⌐0004  2.50⌐ | 60 ⌐1.250KG @2.00 |
| | | PLU0004  $2.50⌐ |
| 56 3 | 61 ⌐      3⌐ | |
| 30 PLU | 62 ⌐0003  1.50⌐ | 63 ⌐1.500KG @1.00 |
| | | PLU0003  $1.50⌐ |
| 35 CA/AT | | 64 ⌐CASH     $4.00⌐ |

Fig.11 (Prior Art)

| KEY INPUT | DISPLAY | PRINT |
|---|---|---|
| 71 SCALE | 76 ⌐1.250  ⌐ | |
| 72 4 | 77 ⌐1.250  4⌐ | |
| 73 PLU | 78 ⌐0004  2.50⌐ | 79 ⌐1.250KG @2.00 |
| | | PLU0004  $2.50⌐ |
| 71 SCALE | 80 ⌐1.500  ⌐ | |
| 74 3 | 81 ⌐1.500  3⌐ | |
| 73 PLU | 82 ⌐0003  1.50⌐ | 83 ⌐1.500KG @1.00 |
| | | PLU0003  $1.50⌐ |
| 75 CA/AT | | 84 ⌐CASH     $4.00⌐ |

POINT OF SALE APPARATUS WITH AN AUTOMATIC DETERMINATION IF WEIGHING A PRODUCT IS NECESSARY OR PROHIBITED

BACKGROUND OF THE INVENTION

1. Field of the Invention

The present invention relates to a register in which a weighing apparatus such as a scale is connected to a processing apparatus such as a personal computer, an office computer, a store controller and an electronic cash register. More particularly, the invention relates to a register for registering sales information such as the number and a sales total of transacted articles.

2. Description of Related Art

Articles sold at a store are largely classified into those whose weight is to be measured by a weighing apparatus so that the sale prices of the articles are to be registered based on the weight, e.g., meat and vegitables, and those which are sold in a unit of the number (i.e., referred to as "scale registering prohibited articles"). Further, those articles which are to be weighed are largely divided into those whose weight must not fail to be measured (hereinafter "scale registering compulsory article") and those which are sold by weight or wrapped and sold in blocks of a certain number of articles (hereinafter "scale registering uncompulsory article").

Customarily, in a store which sells articles which are to be weighed, an electronic cash register (hereinafter simply "register") is disposed which is connected to a weighing apparatus such as a scale. An operator of the register puts an article to be weighed on a weighing plate of the scale so that the register registers the weight of the article.

FIG. 11 is a view showing operation procedures of a conventional register. In FIG. 11, an article with a PLU (Price Look Up) code "0004" is a scale registering uncompulsory article and the unit price of the article is $2.00/kg. An article with a PLU code "0003" is a scale registering compulsory article and the unit price of the article is $1.00/kg.

First, the operator places the article with the PLU code "0004" on the weighing plate of the scale and pushes a scale key 71. In response, the weight of the article is read from the scale and displayed in a display part of the register as indicated at reference numeral 76.

Following this, if a "4" key 72 is pushed using numeric keys, the PLU code "4" of the article is displayed as indicated at reference numeral 77. Further, by pushing a PLU key 73, the PLU code is ascertained as "0004" and a multiplication result of the weight and the unit price "2.50" is displayed as indicated at reference numeral 78, and the weight, the unit price, the name and the sales price of the article are printed on a receipt and the like as indicated at reference numeral 79.

Next, if the scale key 71 is pushed after placing the article with the PLU code "0003," a scale registering compulsory article, on the weighing plate of the scale, the weight of the article is read from the scale and displayed as indicated at reference numeral 80. By thereafter pushing a "3" key 74, the PLU code of the article is displayed as indicated at reference numeral 81. The PLU key 73 is then pushed so that the FLU code is ascertained as "0003" and a multiplication result of the weight and the unit price "1.50" is displayed as indicated at reference numeral 82, whereby the weight, the unit price, the name and the sale price of the article are printed as indicated at reference numeral 83. At last, a "CA/AT" key 75 is pushed and the sales total of the articles is printed as indicated at reference numeral 84.

Thus, the conventional register requires that the scale key is pushed to read the weight of an article from the scale independently of whether the scale is a scale registering uncompulsory article or a scale registering compulsory article. Hence, as the number of articles to be weighed increases, labor of operating the register increases and registering time becomes longer. In the case where the scale key fails to be pushed, the registering time will become even longer.

SUMMARY OF THE INVENTION

Hence, an object of the invention is to offer a register which is operated in a simple manner in measuring and registering the weight of an article.

The invention is directed to a register which is characterized by comprising: means for weighing an article to be registered; means for inputting an article code which is assigned to the article in advance; a memory for storing whether weighing of the article is compulsory in correspondense to the article code; means for judging whether weighing of the article is compulsory while referring to the memory in response to the article code which is inputted by the inputting means; and control means for reading the weight of the article from the weighing means and for registering the weight when the judging means determines that the weighing of the article is compulsory.

The invention is also directed to a register which is characterized by comprising: means for weighing an article to be registered; means for inputting an article code which is assigned to the article in advance; a memory for storing for each article the preliminarily determined article code, the preliminarily determined article name, the unit price per a preliminarily determined unit weight or the price per one article and a preliminarily determined code which shows whether the weighing of the article is compulsory; means for judging whether weighing of the article is compulsory while referring to the memory in response to the article code which is inputted by the inputting means; means for controlling to read the weight of the article from the weighing means and to read the unit price per a unit weight of the article from the memory when the judging means determines that weighing of the article is compulsory; and means for calculating the price to be registered of the article based on the weight and the unit price per a unit weight of the article read by the control means.

According to the invention, after an article whose weight must be measured is weighed using the weighing means such as a scale, the article code which is assigned to the article in advance such as a FLU code is inputted using the inputting means. In response to inputting of the article code, the judging means refers to the memory in which whether weighing of the article is compulsory, and determines that the article is such an article whose weight must be measured. In accordance with the judgement, the control means reads the weight of the article from the weighing means and registers the weight.

Thus, according to the invention, an article whose weight must be measured is registered without pushing a special key such as a scale key, thereby simplifying the registering operation and reducing an operation mistake such as failure to push a key. Hence, registering finishes in a reduced time even when many articles have to be weighed for registering the sales, which makes it possible to deal with an increased number of customers.

BRIEF DESCRIPTION OF THE DRAWINGS

Other and further objects, features, and advantages of the invention will be more explicit from the following detailed description taken with reference to the drawings wherein:

FIG. 3 is a plan view showing the arrangement of keys on a key input panel 26;

FIG. 4 is a view showing the content stored in a department program file 10;

FIG. 5 is a view showing the content stored in a PLU program file 11;

FIG. 10 is a view showing specific operation procedures of the register 1 during finalizing; and FIG. 11 a view showing specific operation procedures of a conventional register to register the sales.

DESCRIPTION OF THE PREFERRED EMBODIMENTS

Figure 1:
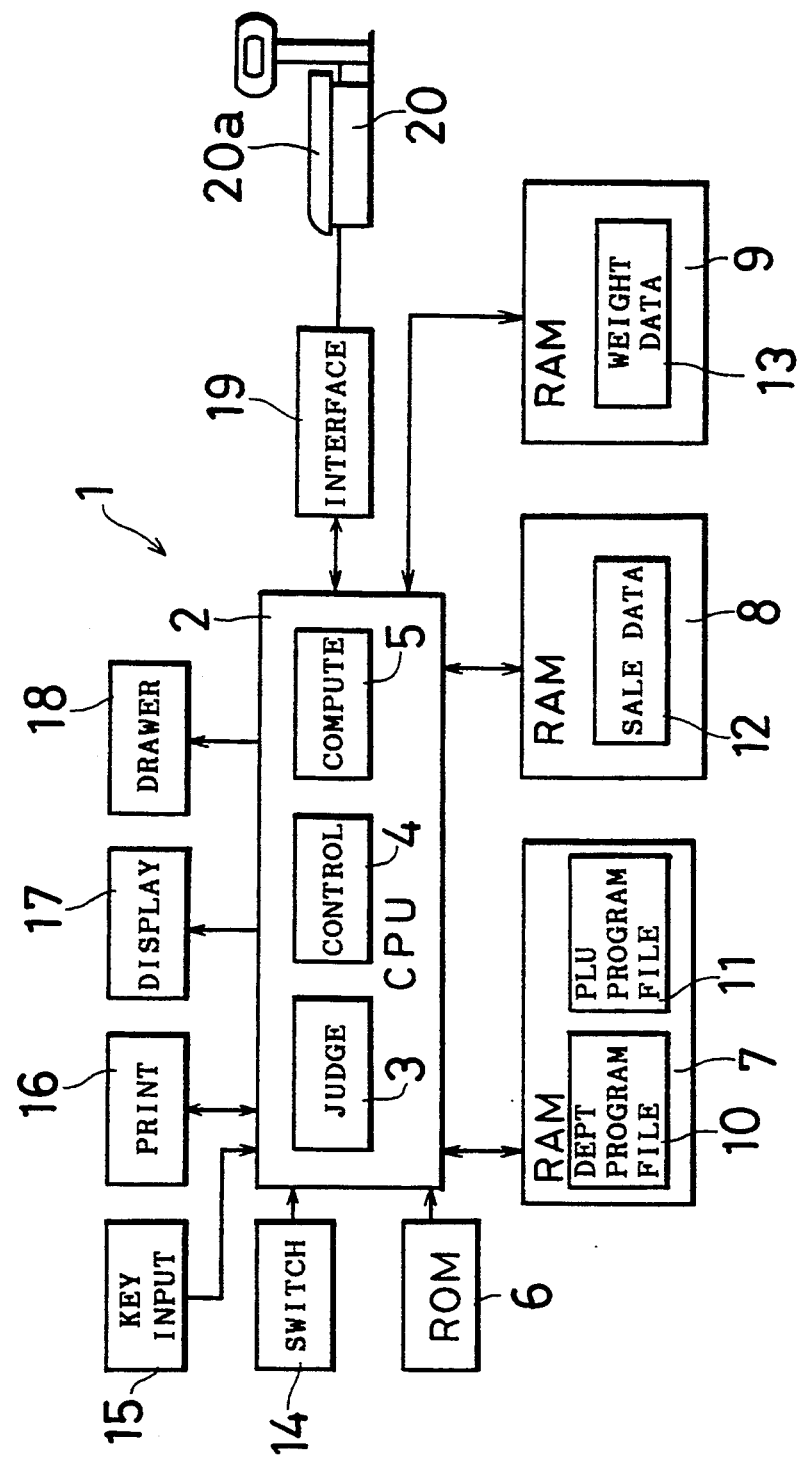
FIG. 1 is a block diagram showing an electric structure of an electronic cash register 1 according to an embodiment of the invention.

Now referring to the drawing, preferred embodiments of the invention are described below.

FIG. 1 is a block diagram showing an electric structure of an electronic cash register 1 according to an embodiment of the invention. The register 1 is comprised of means for judging 3, means for controlling 4, means for computation 5 and etc. The register 1 includes a central processing unit (CPU) 2 which is formed by a microprocessor, for example. To the central processing unit 2, a read only memory (ROM) 6 which stores a program and the like for controlling various operations of the register 1 is connected. A first memory 7 which is formed by a random access memory (RAM), for example, a second memory 8 and a third memory 9 are also connected to the central processing unit 2.

In the first memory 7, a department program file 10, i.e., a memory in which article information such as the names and the unit prices of articles is stored in correspondense to article codes, and a PLU program file 11, i.e., a memory in which the article information is stored in correspondense to PLU codes, are programmed. In the second memory 8, a sale data file 12 is programmed which is used to totalize the sale data such as the number and the amount of sales. In the third memory 9, a weight data storage area 13 is formed in which the weight of the article read from a scale which will be described later is temporarily stored.

Also connected to the central processing unit 2 are means for switch input 14 to switch functions of the register 1, means for key input 15 to input the PLU codes and the like of the articles, means for printing 16, e.g., a printer, to print a computation result obtained by the computation means 5 on a receipt and a recording paper, means for displaying 17, e.g., a liquid crystal display, to display the computation result and the like, and a drawer 18 for containing coins and notes.

A scale 20 for measuring the weight of articles is connected to the central processing unit 2 through a series interface 19 such as RS-232C, RS-422 and RS-485. A article to be weighed is put on a weighing plate 20a of the scale 20 so that the weight of the article will be read by the central processing unit 2.

Figure 2:
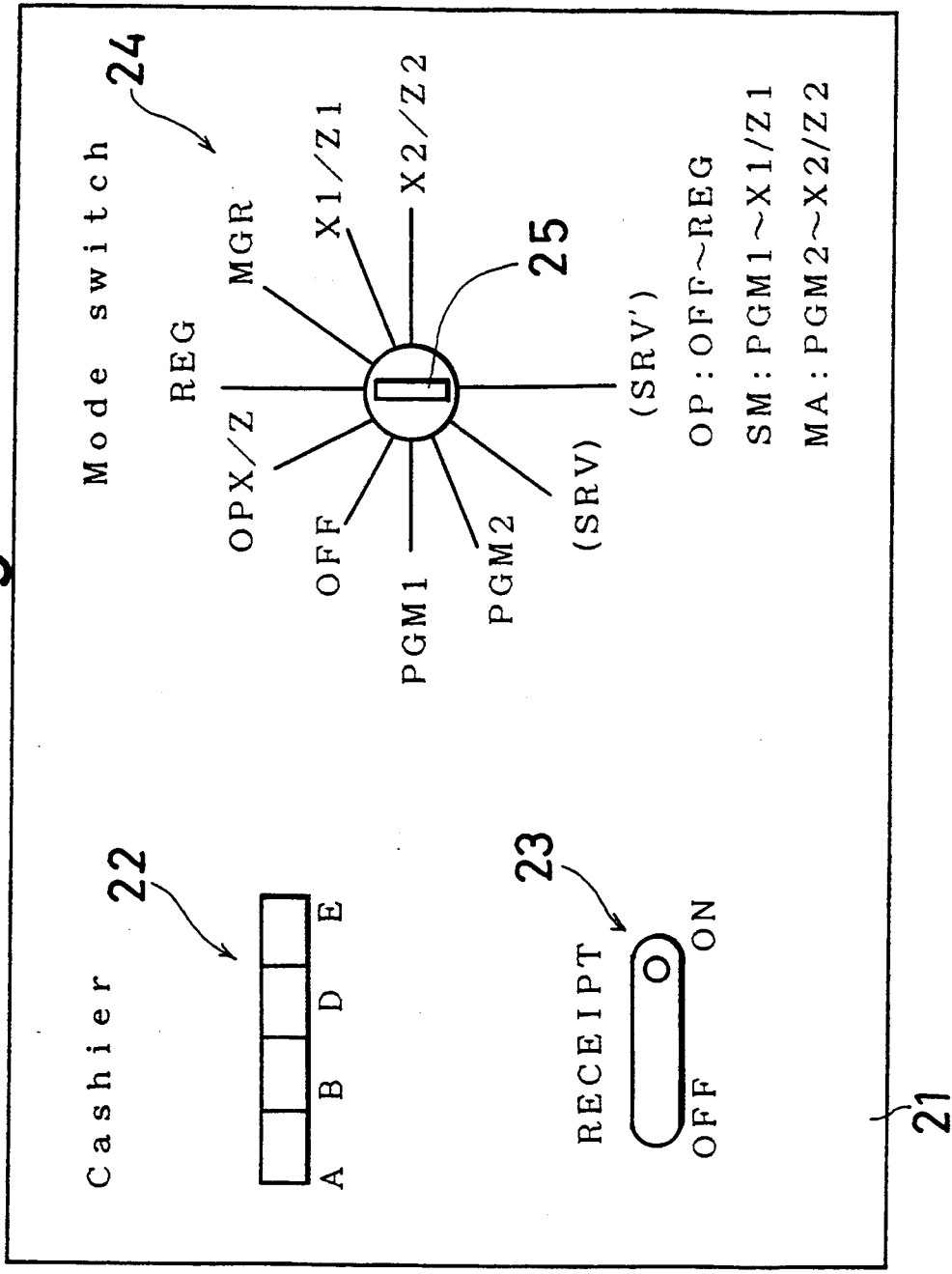
FIG. 2 is a plan view of a switch input panel 21.

FIG. 2 is a plan view of a switch input panel 21 which forms the switch input means 14. The switch input panel 21 comprises a clerk switch 22 for distinguishing a clerk who operates the register, a receipt issue/stop switch 23 which is used to issue and stop issuing a receipt, and a function change switch 24. By inserting and turning a key 25 to a predetermined point, an operator, a responsible person or a manager can change the operation status of the register 1.

The operation statuses of the register include a stop status "OFF", two different program operating statuses "PGM 1, 2" for programming and registering the department code, the PLU code, the name, the unit price and the like of an article which is transacted, a time operating status for making it possible to change a program time, a registration operating status "REG" for making it possible to perform various registrations including finalizing, a management operating status for inputting and outputting information which is necessary for management of the register 1, and a check/accurate operating status for performing check/accurate of sales registered in the register 1 on a daily/monthly total basis.

FIG. 3 is a plan view showing the arrangement of keys on a key input panel 26 which forms the key input means 15. The key input panel 26 comprises various keys such as numeric keys 27 which are used in entering numbers, a plurality of department keys 28 for designating the department to which the article belongs when registered (twenty department keys are provided in this embodiment), a plurality of PLU code keys 29 for designating the PLU code of the article (ninety PLU keys are provided in this embodiment), a PLU key 30 which is used to execute finalizing with the PLU codes, a scale key 31 for reading weight information from the scale 20, "@/FOR" key 32 which is used to program the unit price of the article, a decimal key 33 which is used to enter decimals, a "SBTL" key 34 which is used to confirm a total during transaction, a "CA/AT" key 35 which is used to register cash sales and acount tender.

FIG. 4 is a view showing the content stored in the department program file 10 which is programmed in the first memory 7. The department program file 10 includes a department code storage area 36 for storing the department codes, a unit price storage area 37 for storing the unit prices of articles which correspond to the department codes, an article name storage area 38 for storing the names of the articles, and a scale programming storage area 39 for programming whether the articles are scale registering prohibited articles or scale registering uncompulsory articles or scale registering compulsory articles. In the department program file 10, for each department code, independent storage areas 40 to 43 are formed.

FIG. 5 is a view showing the content stored in the PLU program file 11 which is also programmed in the first memory 7. The PLU program file 11 includes a PLU code storage area 44 for storing the PLU codes, a unit price storage area 45 for storing the unit prices of articles which correspond to the PLU codes, an article name storage area 46 for storing the names of the articles, and a scale programming storage area 47 for programming whether the articles are scale registering prohibited articles or scale registering uncompulsory articles or scale registering compulsory articles. In the PLU program file 11, for each PLU code, independent storage areas 48 to 51 are formed.

In the scale programming storage areas 39 and 47, a flag with "00" indicates that scale registering is prohibited, a flag with "01" indicates that scale registering is not compulsory and a flag with "02" indicates that scale registering is compulsory.

Figure 6:
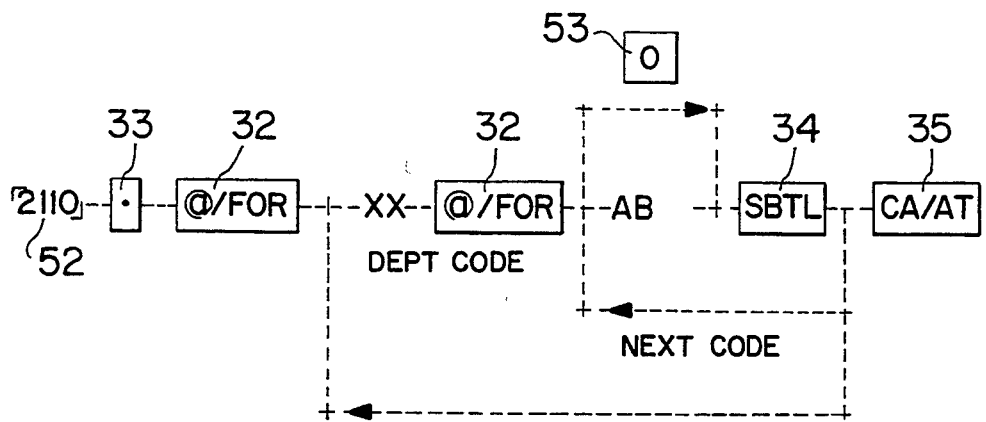
FIG. 6 is a view showing operation procedures of changing the content programmed in the department program file 10.

FIG. 6 is a view showing operation procedures of changing the content programmed in the department program file 10 which is shown in FIG. 4. At an initial stage, to bring the register 1 into a status in which various registrations are possible, the predetermined key 25 is inserted into the function change switch 24 and turned to a position indicated at a character "PGM2," for instance. A JOB code "2110" 52, i.e., a code for changing programs, is inputted using the numeric keys 27, following which the decimal key 33 and the "@/FOR" key 32 are tapped in this order. Next, the department code of an article which is to be changed is inputted using the numeric keys 27, following which the "@/FOR" key 32 is pushed. Next, one of the numeric keys 27 "0" to "2" is pushed to change a scale program and the "SBTL" key 34 is pushed.

Following this, package numbers (nine types of package numbers in this embodiment) for subtracting the weight of a package which is used when the article to be weighed is placed on the weighing plate 20a of the scale 20 are changed using the numeric keys 27 and the "SBTL" key 34 is pushed. In the case where there is no need to change the scale program and the package numbers, a "0" key 53 is pushed using the numeric keys 27 and the "SBTL" key 34 is pushed. When the programs need to be changed as to the other department codes, the department codes of other articles are inputted and similar procedures are performed, followed by push of the "CA/AT" key 35 to thereby complete changes of the programs.

Figure 7:
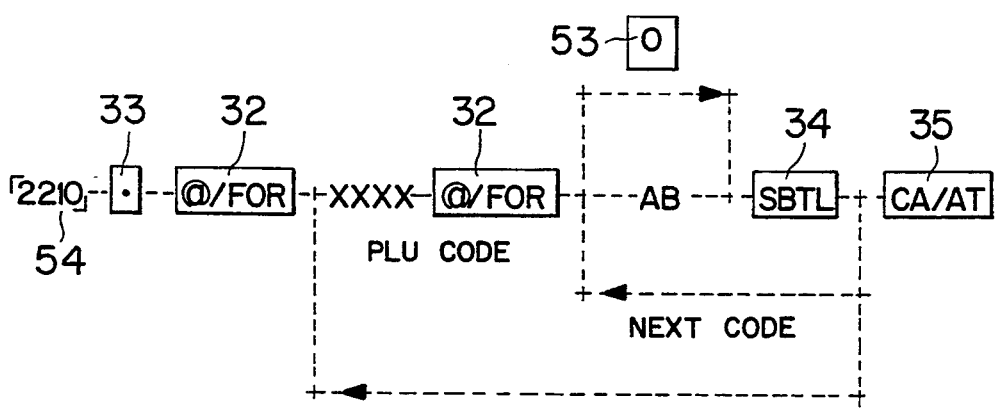
FIG. 7 is a view showing operation procedures of changing the content programmed in the PLU program file 11.

FIG. 7 is a view showing operation procedures of changing the content programmed in the PLU program file 11 which is shown in FIG. 5. Procedures illustrated in FIG. 7 are similar to those described above except that a JOB code "2210" 54 and the PLU codes are to be inputted, and therefore, detailed description will not be given.

Figure 8:
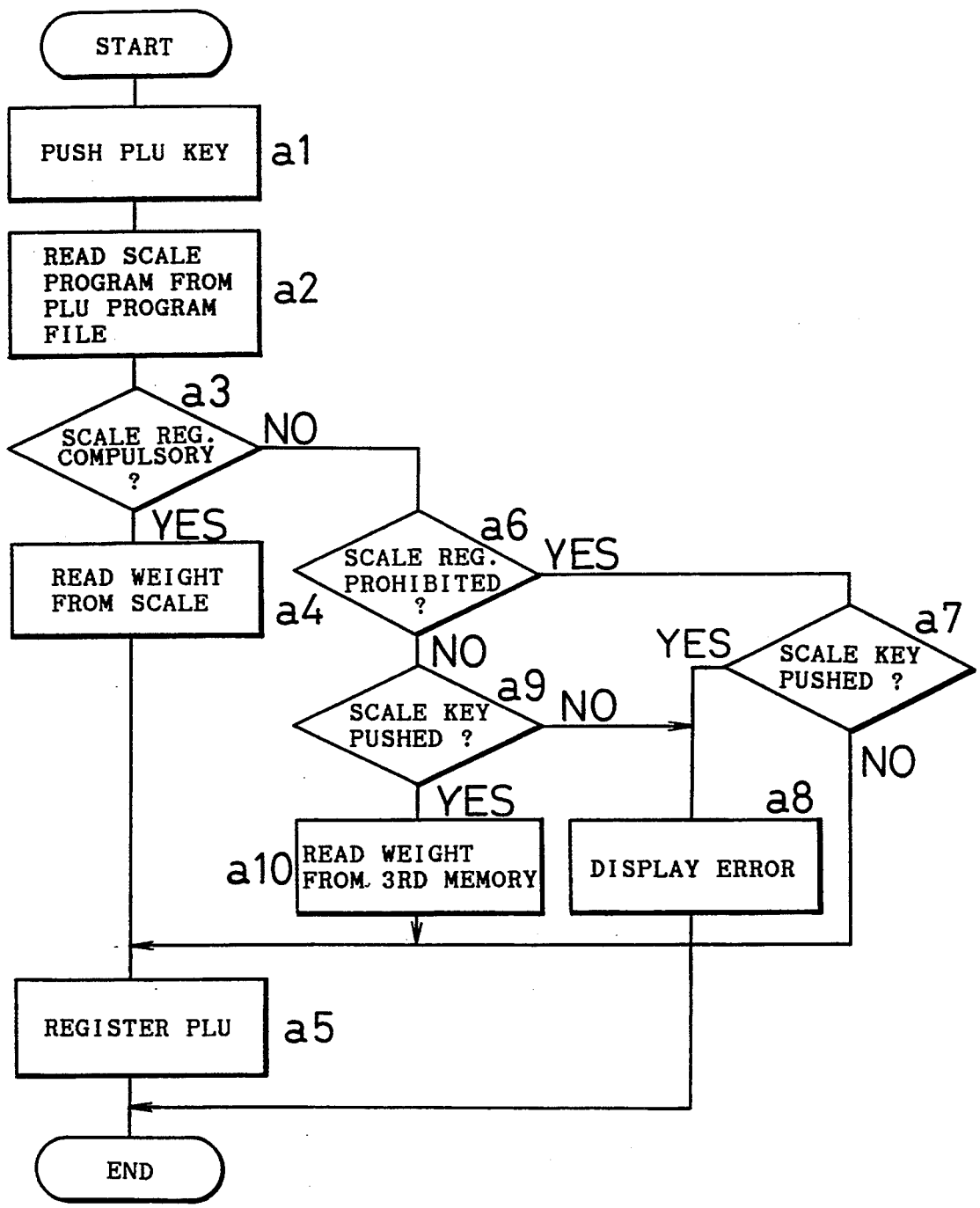
FIG. 8 is a flow chart showing operations of the register 1 in response to push of a PLU key 30.

FIG. 8 is a flow chart showing operations of the register 1 of when the PLU codes are inputted. First, at a step a1, the PLU key 30 is pushed after inputting the PLU code using the numeric keys 27. At a step a2, the control means 4 searches an independent storage area which corresponds to the inputted PLU code from the PLU program file 11 of the first memory 7, and reads a scale program of the corresponding PLU code. Next, at a step a3, the judging means 3 judges whether the scale program calls for compulsory scale registration, i.e., whether the programmed flag is "02." When it is judged that the scale program calls for compulsory scale registration, the sequence proceeds to a step a4 while when it is judged that the scale program does not call for compulsory scale registration, the sequence proceeds to a step a6. At the step a4, the control means 4 reads the weight information of the article from the scale 20 through the series interface 19 and the sequence proceeds to a step a5.

In the case where it is judged that the scale program does not call for compulsory scale registration at the step a3, i.e., the flag of the scale program is "00" or "01," the sequence proceeds to the step a6. At the step a6, it is judged whether the scale program calls for prohibition of scale registration, i.e., whether the flag of the scale program is "00" or "01." When it is judged that prohibition of scale registration is called for, i.e., the flag of the scale program is "00," the sequence proceeds to a step a7.

At the step a7, the judging means 3 judges whether the scale key 31 was pushed. In the case that the scale key 31 was pushed, the sequence proceeds to a step a8 at which display means 17, demanded by the control means 4, displays an error. When it is judged at the step a7 that the scale key 31 was not pushed, the sequence returns to the step a5.

In the case where it is judged at the step a6 that the scale program does not call for prohibition of scale registration, i.e., the flag of the scale program is "01," the sequence proceeds to a step a9 at which it is judged likewise at the step a7 whether the scale key 31 was pushed. When it is judged at the step a9 that the scale key 31 was not pushed, the sequence returns to the step a8 at which the display means 17, demanded by the control means 4, displays an error. When it is judged at the step a9 that the scale key 31 was pushed, the sequence proceeds to the step a10 at which the control means 4 reads the weight information of the article from the weight information storage area 13 which is formed in the third memory 9 and the sequence returns to the step a5.

At the step a5, the control means 4 reads from the PLU program file 11 the unit price and the name of the article which are determined in advance in correspondense to the inputted PLU code. Calculation is performed on the various information thus read by the computation means 5. For instance, as to an article weighed by the scale 20, the weight and the unit price of the article are multiplied, while as to an article which is sold in blocks of a certain number, the number and the unit price are multiplied. The various information such as a computation result yielded by the computation means 5 are stored in the sale data file 12 which is formed in the second memory 8 under the control of the control means 4. At the end of the program the subroutine of FIG. 8 ends and control of the apparatus returns to the control means of CPU2.

Figure 9:
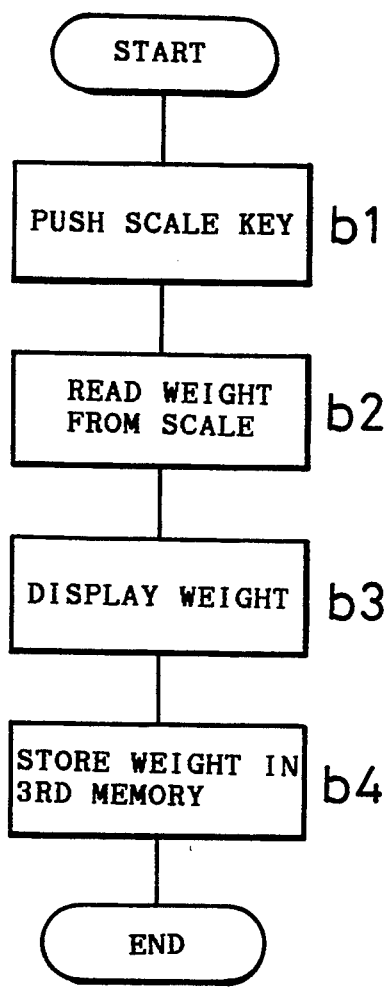
FIG. 9 is a flow chart showing operations of the register 1 in response to push of a scale key 31.

FIG. 9 is a flow chart showing operations of the register 1 in response to push of the scale key 31 at the step a9 shown in FIG. 8. First, at a step b1, the scale key 31 is pushed so that the sequence proceeds to a step b2 at which the control means 4 reads the weight information from the scale 20 through the series interface 19. Next, at a step b3, the control means 4 drives the display means 17 to display the weight of the article, and at a step b4, the weight information read in this manner is stored in the weight information storage area 13 of the third memory 9. At the end of the program the subroutine of FIG. 9 ends and control of the apparatus returns to the control means of CPU2. The weight information stored in the weight information storage area 13 of the third memory 9 is read by the control means 4 at the step a10 of FIG. 8.

FIG. 10 is a view showing specific operation procedures of the register 1 during finalizing. First, at an initial stage, to bring the register 1 into a status in which various registrations are possible, the predetermined key 25 is inserted into the function change switch 24 and turned to a position indicated at a character "REG." Next, an article with the PLU code "0004" is placed on the weighing plate 20a of the scale 20. As shown in FIG. 5, since the article with the PLU code "0004" is a scale registering uncompulsory article, the scale key 31 must be pushed. When the code of the scale key 31 is inputted, the control means reads the weight information about the article with the PLU code "0004" from the scale 20 through the series interface 19, and as indicated at reference numeral 57, drives the display means 17 to display the weight and stores the weight data thus read in the weight information storage area 13 of the third memory 9 temporarily.

Following this, to input the PLU code, a "4" key 55 is pushed using the numeric keys 27. In response to this, as indicated at reference numeral 58, the display means 17 displays "4" following "1.250," or the weight of the article, under the control of the control means 4. Further, when the PLU key 30 is pushed, the control means 4 searches the independent storage area 51 which corresponds to the FLU code "0004" from the PLU program file 11 shown in FIG. 5, and reads the flag "01" which corresponds to the scale programming storage area 47. Based on the flag "01" thus read, the judging means 3 judges that the article with the PLU code "0004" is a scale registering uncompulsory article, and further judges whether the scale key 31 has been already pushed. In this case, since the scale key 31 has been already pushed as described above, the control means 4 reads the weight data stored in the weight information storage area 13 of the third memory 9 and further reads from the PLU program file 11 the unit price and the name of the article which were preliminarily programmed in the independent storage area 51 which corresponds to the PLU code "0004."

The computation means 5 multiplies the weight (1.250 kg) and the unit price ($ 2.00/kg) of the article. The control means 4, as indicated at reference numeral 59, instructs the display means 17 to diaplay the PLU code "0004" and the sale price which is found as a computation result ($ 2.50). Further, the control means 4 causes that the weight, the unit price, the name and the sale price of the article with the PLU code "0004" thus calculated are stored in the sale data file 12 which is formed in the second memory 8, and as indicated at reference numeral 60, drives the print means 16 to print these information on a receipt and a recording paper.

Next, an article with the PLU code "0003" is placed on the weighing plate 20a of the scale 20. As shown in FIG. 5, since the article with the PLU code "0003" is a scale registering compulsory article, the scale key 31 needs not be pushed. When a "3" key 56 is pushed using the numeric keys 27, as indicated at reference numeral 61, the control means 4 drives the display means 17 to diaplay "3." Further, when the PLU key 30 is pushed, the control means 4 searches the independent storage area 50 which corresponds to the FLU code "0003" from the PLU program file 11 shown in FIG. 5, and reads the flag "02" which corresponds to the scale programming storage area 47. Based on the flag "02" thus read, the judging means 3 judges that the article with the PLU code "0003" is a scale registering compulsory article. The control means 4 reads the weight information of the article with the PLU code "0003" from the scale 20 through the series interface 19, and further reads from the PLU program file 11 the unit price and the name of the article which were preliminarily programmed in the independent storage area 50 which corresponds to the PLU code "0003."

The computation means 5 multiplies the weight (1.250 kg) and the unit price ($ 1.00/kg) of the article. The control means 4, as indicated at reference numeral 62, instructs the display means 17 to diaplay the PLU code "0003" and the sale price which is found as a computation result ($ 1.50). Further, the control means 4 causes that the weight, the unit price, the name and the sale price of the article with the PLU code "0003" thus calculated are stored in the sale data file 12 which is formed in the second memory 8, and as indicated at reference numeral 63, drives the print means 16 to print these information on a receipt and a recording paper.

Finally at a final stage, the "CA/AT" key 35 is pushed so that the control means 4 reads the both sale prices ($ 2.50 and $ 1.50) from the sale data file 12 which is formed in the second memory 8 and the computation means 5 adds up the sale prices. As indicated at reference numeral 64, under the control of the control means 4, "CASH" which indicates a sale method and a sale total, i.e., a result of addition, are printed.

Thus, according to this embodiment, in the case where an article to be weighed is a scale registering compulsory article, the scale key 31 needs not be pushed. Instead, by pushing the PLU key 30, it is possible to read the weight information of the article directly from the scale 20. Hence, the operation of pushing the scale key 31 can be omitted.

In this embodiment, the scale key 31 may be pushed in registering scale registering compulsory articles as is customarily done. By programming to allow this, it is possible to eliminate a possibility that an operator who is not familiar with the new registration procedures of the register 1 will make a mistake while operating the register 1.

In such a case, when the scale key 31 is pushed, the weight data from the scale 20 are temporarily stored in the weight information storage area 13 of the third memory 9. Since the weight data stored in the weight information storage area 13 can be deleted by pushing the PLU key 30, the weight data can be read directly from the scale 20 similarly to described above.

Although the PLU codes are inputted via the key input means 15 in this embodiment, the PLU codes may be inputted using means for reading and inputting such as a hand scanner. In addition, although only PLU codes have been described with reference to FIGS. 8 to 10, needless to mention, the embodiment is also applicable to the department codes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A point-of-sale apparatus comprising:
a key input unit including a "scale" key;
a display;
means for weighing an article;

means for inputting to said apparatus an article code which has been assigned to the article in advance;

means for storing said article code and, in correspondence to the article code, whether registration of the article weight is compulsory and, if not compulsory, is prohibited, as well as the price per unit weight if the registration of article weight is compulsory or the price per unit article if the registration of article weight is prohibited;

means for judging whether registration of the article weight is compulsory and, if not compulsory, if registration of the article weight is prohibited while referring to the means for storing;

control means for causing the weight of the article to be read by the means for weighing and for registering the weight of the article if the means for judging determines that registration of the article weight is compulsory and for causing the display to display an error message if the means for judging determines that: (1) registration of the article weight is prohibited and (2) the "scale" key has been pushed; and means for registering the sale price of the article as the product of the registered weight and unit price per unit weight if the registration of the article weight is compulsory, or as the price per article if the registration of the article weight is prohibited.

2. In a point-of-sale apparatus having a key input unit with a "scale" key, a display, means for weighing an article, and means for inputting to said apparatus an article code which has been assigned to the article in advance, the improvement comprising:

means for storing said article code and, in correspondence to the article code, whether registration of the article weight is compulsory and, if not compulsory, is prohibited;

means for judging whether registration of the article weight is compulsory and, if not compulsory, is prohibited while referring to the means for storing; and control means for causing the weight of the article to be read by the means for weighing and for registering the weight of the article if the means for judging determines that registration of the article weight is compulsory and for causing the display to display an error message if the means for judging determines that: (1) registration of the article weight is prohibited and (2) the scale key has been pushed.

* * * * *